United States Patent
Serban et al.

(10) Patent No.: US 8,793,139 B1
(45) Date of Patent: Jul. 29, 2014

(54) VOICE ACTIVATED COCKPIT MANAGEMENT SYSTEM FOR FLIGHT PROCEDURES AND CONTROL OF AIRCRAFT SYSTEMS AND FLIGHT MANAGEMENT SYSTEMS OF SINGLE AND MULTI-ENGINE AIRCRAFT

(71) Applicant: NexGen Flight LLC, Carlsbad, CA (US)

(72) Inventors: Doinita Serban, Carlsbad, CA (US); Justin McBride, Carlsbad, CA (US)

(73) Assignees: Nexgen Flight LLC., Carlsbad, CA (US); Doinita Diane Serban, Carlsbad, CA (US)

( * ) Notice: Subject to any disclaimer, the term of this patent is extended or adjusted under 35 U.S.C. 154(b) by 0 days.

(21) Appl. No.: 14/072,804

(22) Filed: Nov. 6, 2013

(51) Int. Cl.
*G10L 21/00* (2013.01)

(52) U.S. Cl.
USPC .......................................................... 704/275

(58) Field of Classification Search
USPC .......................................................... 704/275
See application file for complete search history.

(56) References Cited

U.S. PATENT DOCUMENTS

| | | | |
|---|---|---|---|
| 4,725,956 A | 2/1988 | Jenkins | |
| 5,926,790 A | 7/1999 | Wright | |
| 6,044,322 A | 3/2000 | Stieler | |
| 6,125,341 A | 9/2000 | Raud et al. | |
| 6,173,192 B1 | 1/2001 | Clark | |
| 6,285,926 B1 | 9/2001 | Weiler | |
| 6,512,527 B1 | 1/2003 | Barber et al. | |
| 6,529,706 B1 | 3/2003 | Mitchell | |
| 6,567,395 B1 | 5/2003 | Miller | |
| 6,704,553 B1 | 3/2004 | Eubanks | |
| 6,720,890 B1 | 4/2004 | Ezroni et al. | |
| 6,745,165 B2 | 6/2004 | Lewis et al. | |
| 6,832,152 B1 | 12/2004 | Bull et al. | |
| 7,010,490 B2 | 3/2006 | Brocious et al. | |
| 7,606,327 B2 | 10/2009 | Walker et al. | |
| 7,606,715 B1 | 10/2009 | Krenz | |
| 2002/0165647 A1* | 11/2002 | Glenn et al. | 701/3 |
| 2003/0006910 A1* | 1/2003 | Dame | 340/945 |
| 2004/0015381 A1* | 1/2004 | Johnson et al. | 705/8 |
| 2004/0124998 A1* | 7/2004 | Dame | 340/945 |
| 2009/0015437 A1* | 1/2009 | Campagne et al. | 340/945 |
| 2011/0127380 A1* | 6/2011 | Orgerie et al. | 244/118.5 |
| 2011/0219267 A1* | 9/2011 | Migliasso et al. | 714/37 |
| 2012/0111046 A1* | 5/2012 | Wilmot et al. | 62/324.6 |
| 2012/0265372 A1* | 10/2012 | Hedrick | 701/3 |
| 2012/0319869 A1* | 12/2012 | Dorfmann et al. | 340/945 |
| 2013/0083960 A1* | 4/2013 | Kostrzewski et al. | 382/103 |

\* cited by examiner

*Primary Examiner* — Michael N Opsasnick
(74) *Attorney, Agent, or Firm* — Nexgen Flight LLC.; Doinita Diane Serban (57) ABSTRACT

A voice activated cockpit management system for flight procedures and control of aircraft systems and flight management systems of single and multi-engine aircraft, including a mean to recognize and communicate commands, and to deploy procedures utilizing a NEXT-GEN voice recognition system. A specific feature of this mode of initiation is the automatic communication of flight procedures (normal or emergency procedures) and control procedures for aircraft systems and flight management systems by the utterance of specific key words resulting in the automatic transference of these command words to executable procedure audio-files. The said cockpit management system for providing automated voice activated procedures enables cockpit specific audio procedures through wireless Bluetooth connection or wired communication, and generally includes A Voice Recognition and Audio-Display System, A Mini-PC, A Listening Device, A Microphone, A Power-Source, A Pairing System, Bluetooth Software and Hardware, A Method for Voice Recognition and Audio-Display of Procedures on to pilot.

20 Claims, 2 Drawing Sheets

VOICE ACTIVATED COCKPIT MANAGEMENT SYSTEM FOR FLIGHT PROCEDURES AND CONTROL OF AIRCRAFT SYSTEMS AND FLIGHT MANAGEMENT SYSTEMS OF SINGLE AND MULTI-ENGINE AIRCRAFT

BACKGROUND OF THE INVENTION

1. Field of the Invention

The present invention relates generally to a novel aircraft cockpit management systems, and more particularly to the specifics of the emergency procedures, normal aircraft operating procedures, aircraft operating systems monitoring and control, flight management systems, in single and multi-engine small and large aircraft utilizing a voice recognition system.

The present invention relates to novel voice activated cockpit management systems and more specifically it relates to a novel voice activated cockpit management system for single and multi-engine aircraft providing a novel Next-Gen voice activated cockpit management system for emergency procedures, normal procedures, operating systems monitoring and control, enabling unique and specific audio in/out procedure steps through novel voice enabled commands and wireless Bluetooth connection and communication software and hardware.

2. Description of the Related Art

Voice Recognition systems as alternative for man-machine-interfaces is becoming more and widely used. However in the flight environment conditions they have found limited use due to the unique challenges presented by elevated noise levels, unique grammar rules, unique vocabulary, and hardware limitations, all associated with the cockpit environment. Meanwhile, command recognitions or selections from address book entries in mobile devices, such us mobile phones, are standard functions. In automobiles speech recognition systems are applied to record, e.g. starting endpoint and end point in a navigation system.

Voice Recognition algorithms rely upon grammar and semantics to determine the best possible text match(es) to the uttered phrase(s). Conventionally they are based on Hidden-Markov-models, which enable recognition but require high computing time. Since embedded systems are often employed as computing entities, having limited computing and storing resources has added to the limitation of applications of the voice recognition to the cockpit environment to date, and engendered simplified speech recognition. Constraints in the search space and saving of the resources is coming along with less reliable speech recognition and/or less comfortable handling for the user in addition to the specific limitations imposed by the cockpit environment.

The aircraft operating environment is very unique in the grammar rules that are followed and the vocabulary that is used. The grammar suite is rather extensive including "words" that represent unusual collections of characters (e.g. intersection or fix names). Same goes for the vocabulary with specific code "words" that engender particular sequences of actions in the cockpit that are known only to professionally trained pilots and not available through colloquial language. Elongation of the expression to be recognized within colloquial language even without the complexity of the pilotage grammar and vocabulary will lead to extremely high requirements in memory and computing power. These factors make it difficult to develop a comprehensive grammar and vocabulary set for use on an aircraft, and this has represented one of several significant challenges to bringing Voice Recognition to the cockpit. The elevated noise environment in flight conditions can increase in the cockpit up to 6-7 times the general room noise level found on the ground, which adds to the complexity of the task since specialized hardware and additional technology that engender voice recognition and is required.

Others have attempted to use dynamic grammar for enhancing voice recognition systems. For example, U.S. Pat. No. 6,125,341, entitled "Speech Recognition System and Method," issued to H. F. Raud et al, discloses a speech recognition system having multiple recognition vocabularies, and a method of selecting an optimal working vocabulary used by the system. Each vocabulary is particularly suited for recognizing speech in a particular language, or with a particular accent or dialect. The system prompts a speaker for an initial spoken response; receives the initial spoken response; and, compares the response to each of a set of possible responses in an initial speech recognition vocabulary to determine a response best matched in the initial vocabulary. A working speech recognition vocabulary is selected from a plurality of speech recognition vocabularies, based on the best matched response.

U.S. Pat. No. 6,745,165, entitled "Method and Apparatus For Recognizing From Here To Here Voice Command Structures in a Finite Grammar Speech Recognition System," issued to J. R. Lewis et al, discloses a method and system that uses a finite state command grammar coordinated with application scripting to recognize voice command structures for performing an event from an initial location to a new location. The method involves a series of steps, including: recognizing an enabling voice command specifying the event to be performed from the initial location; determining a functional expression for the enabling voice command defined by one or more actions and objects; storing the action and object in a memory location; receiving input specifying the new location; recognizing an activating voice command for performing the event up to the new location; retrieving the stored action and object from the memory location; and performing the event from the initial location to the new location according to the retrieved action and object. Preferably, the enabling-activating command is phrased as "from here . . . to here". The user specifies the new location with voice commands issued subsequent to the enabling command. To reduce the occurrence of unintended events, these voice commands are counted so that if they exceed a predetermined limit, the action and object content is cleared from memory.

U.S. Pat. No. 7,010,490, entitled "Method, System, and Apparatus for Limiting Available Selections in a Speech Recognition System," issued to L. A. Brocious et al, discloses a method and system for completing user input in a speech recognition system. The method can include a series of steps which can include receiving a user input. The user input can specify an attribute of a selection. The method can include comparing the user input with a set of selections in the speech recognition system. Also, the method can include limiting the set of selections to an available set of selections which can correspond to the received user input. The step of matching a received user spoken utterance with the selection in the available set of selections also can be included.

Generally, any variation in the grammar implemented in a voice recognition system is based upon previous commands or states computed within the voice recognition system. Such types of systems would have limited applicability in an avionics environment because the grammar in cockpit management systems is very fragmented for specific cockpit procedural functions.

Current voice recognition parameters call for voice command of these cockpit procedural functions by means of speaking specific words to engender display of audio procedures in the listening device which equate to the intended procedure available to this date in operational cockpits in hard copy or visual display. A key-to-recognize (type-procedure) "word" would require the crew to speak the utterance associated with a specific operational procedure.

SUMMARY OF THE INVENTION

In a broad aspect, the present invention is a novel cockpit management system, including a means to enable communication of operational procedures utilizing a voice recognition system. A specific feature of this mode of initiation is the automatic communication of the task by the utterance of specific key words resulting in the automatic transference of procedures to audio files. For example, in one of the most relevant cases the command "ENGINE FIRE DURING FLIGHT" is equated to audio display of a 10-step emergency procedure with pilot interactive feedback during each step. The voice recognition system preferably includes a Key-To-Recognize (KTR) utterance for interacting with a Decision Management System Application (DMSA) of the cockpit management system to signal automatic speech recognition software to begin processing voice commands. A mini PC comprising an embedded KTR application for accepting commands from the KTR and displaying the results of the procedure (i.e. emergency) commands. A voice recognition (VR) subsystem is operatively connected to the Storage Device comprising automatic speech recognition software for processing the digital signal received from the mini PC, the VR subsystem for sending out procedure (i.e. emergency) data labels to the DMSA, and Network Data Objects (NDOs) to a Bluetooth Device. A Listening Device (LD) is operatively connected through Bluetooth to the mini PC for managing the placement of audio displays. A DMSA connected into a Procedure System Application (PSA) is operatively connected to the VR subsystem for rendering and processing the procedure (i.e. emergency) commands displayed by the LD. A listening device (LD) renders the displays based on the procedure (i.e. emergency) data labels.

The invention generally relates to a first in class Next-Gen voice activated cockpit management system which includes A Voice Recognition System for Cockpit Management System Through Voice Recognition and Audio Display, A Procedure-Based Cockpit Management System for Single and Multi-Engine Aircraft Through Voice Recognition And Audio Display, A Mini-PC, A Listening Device, A Microphone, A Power Source, A Pairing System and Automatic Pairing Application, Bluetooth Software and Hardware, A Method for Voice Activation of Pilotage Procedures In The Cockpit of Single and Multi-Engine Aircraft through Voice Recognition and Audio Display.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a novel voice activated cockpit management system for flight procedures in single and multi-engine aircraft for providing a voice activated cockpit management system for procedures (i.e. emergency) in single and multi-engine aircraft enabling unique and specific audio procedures through wireless Bluetooth connection communication hardware and software.

Another object is to provide a novel Voice Activated Cockpit Management System For Flight Procedures In Single And Multi-engine Aircraft that includes a mean to communicate commands and deploy aircraft procedures (i.e. emergency) in the cockpit utilizing voice.

Another object is to provide a Voice Activated Cockpit Management System For Flight Procedures In Single And Multi-engine Aircraft that includes a mean to communicate voice commands utilizing a novel voice recognition system enabled by application software and hardware.

Another object is to provide a Voice Activated Cockpit Management System For Flight Procedures In Single And Multi-engine Aircraft that includes a novel voice recognition system operative in an environment with elevated noise levels of up to 136 dB compatible with aircraft operation.

Another object is to provide a Voice Activated Cockpit Management System For Flight Procedures In Single And Multi-engine Aircraft that includes performance parameters that are specific and engender the operation of the voice recognition engine in the voice recognition system with high accuracy and precision at elevated noise levels of up to 136 dB found in the cockpit flight environment of the operating aircraft.

Another object is to provide a Method for A Voice Activated Cockpit Management System For Flight Procedures In Single And Multi-engine Aircraft that includes a novel speech recognition mechanism with recognition for expressions having multiple expression parts, or "multi-gram" mode, rather than the single word recognition from a large pool, or the "batch" mode, found in prior related art as a mean to communicate voice commands utilizing a novel voice recognition system enabled by application software and hardware. By this method lower requirements for memory and computing capacity are attained and higher accuracy scores are recorded. In this method the expression is subjected to a partial speech recognition using a modified novel Hidden-Markov-Model. As such when for example the partial "multi-gram" expression to recognize is placed at the beginning of the complete expression, a specific number of triphones are firstly captured with respect to time and are employed in recognition training, while the remainder of the captured expression parts are trained using synthetic triphones or 'synthetic linkers'.

Another object is to provide a Voice Activated Cockpit Management System For Flight Procedures In Single And Multi-engine Aircraft that includes a novel voice recognition system comprising novel cockpit synthetic triphones in the vocabulary specific for the audio operational procedures associated with operation of single and multi-engine aircraft.

Another object is to provide a Voice Activated Cockpit Management System For Flight Procedures In Single And Multi-engine Aircraft that includes a novel voice recognition system comprising a novel cockpit grammar and novel cockpit syntax specific for the audio operational procedures associated with operation of single and multi-engine aircraft.

Another object is to provide a Voice Activated Cockpit Management System For Flight Procedures In Single And Multi-engine Aircraft that includes a novel voice recognition system comprising a novel cockpit vocabulary specific for the audio operational procedures associated with operation of single and multi-engine aircraft.

Another object is to provide a Voice Activated Cockpit Management System For Flight Procedures In Single And Multi-engine Aircraft that has a specific key-to-recognize feature in the voice recognition system which initiates automatic communication of the procedure type (i.e. emergency procedures) by the utterance of specific key words resulting in the automatic transference of the commands to executable audio procedures.

Another object is to provide a Voice Activated Cockpit Management System For Flight Procedures In Single And Multi-engine Aircraft that includes a novel key-to-recognize (KTR) software application in the voice recognition system. This KTR interacts with a novel decision management system application (DMSA) of the cockpit management system to operate a decision tree algorithm and signal automatic speech recognition software to begin processing voice commands.

Another object is to provide a Voice Activated Cockpit Management System For Pilotage Procedures In Single And Multi-engine Aircraft that includes a voice recognition system comprising a novel decision management system application encompassing a decision tree algorithm that enables continuous speech of voice command application of Pilotage procedures (i.e. emergency procedures) of extended contiguity limits by number of utterances, namely one hundred fifty utterances, with high recognition success rate (98%-100%) in the cockpit environment. These unprecedented levels of recognition satisfy operational efficiency and safety congruently.

Another object is to provide a Voice Activated Cockpit Management System For Pilotage Procedures In Single And Multi-engine Aircraft that includes a procedure system application software and a procedure system data labels library applicable to small and large, single and multi-engine aircraft. The said procedure system data labels library in said system provides search terms in "allophones" without a phonemic transcription of voice-to-text and text-to-voice, and can be embellished as a removable medium such us an SD card. Such databases for navigation systems or other speech recognition applications are "SAMPA" (Speech Assessment Method Phonetic Alphabet) formatted in prior application and related art. This complies with a phonetic alphabet which describes a machine-readable encoding as ASCII symbols of phonetic alphabets. Our SD device does not comprise SAMPA formatting as recognition and audio-display is executed without voice-text-voice transcription.

Another object is to provide a Voice Activated Cockpit Management System For Flight Procedures In Single And Multi-Engine Aircraft, which includes a novel automatic pairing software application which engenders automatic pairing of any one of the multiple brands of listening devices available for pairing to the voice recognition system.

Another object is to provide a Voice Activated Cockpit Management System For Flight Procedures In Single And Multi-engine Aircraft that that includes a pairing switch which enables the one time initial pairing of the listening device of choice to the voice recognition system.

Another object is to provide a Voice Activated Cockpit Management System For Flight Procedures In Single And Multi-engine Aircraft that includes a novel voice recognition system software application enabling voice activation in the cockpit through wireless Bluetooth connection communication hardware and software. Alternatively wired communication hardware and software is included in said system.

Another object is to provide a Voice Activated Cockpit Management System For Flight Emergencies In Single And Multi-engine Aircraft that is hosted onto a mini PC comprising a minimum 700 MHz processor, minimum 500 MB memory, connected through a pairing switch to a listening device (LD) with a microphone, using Bluetooth communication and Bluetooth adapter, powered by a battery source, and using a storage device of minimum 4 GB. The recording of the voice command is carried out by a microphone and a downstream analogous-/digital-converter which provides the digital expression to further computing units, i.e. a CPU in an embedded system. The first search will be executed by a controlling or computing entity which accesses a procedure database and according phonemes of search terms. Establishing of a cockpit speech recognition vocabulary requires high computing power and comprehensive memory space for buffering the readable and processable vocabulary of speech recognition being implemented. By using the multi-gram recognition mode and the architectural decision tree algorithm of the Decision Management System Application, the CPU and memory requirements are guaranteed to be used with maximum efficiency and thus applicable to embedded systems characteristic of cockpit hardware.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
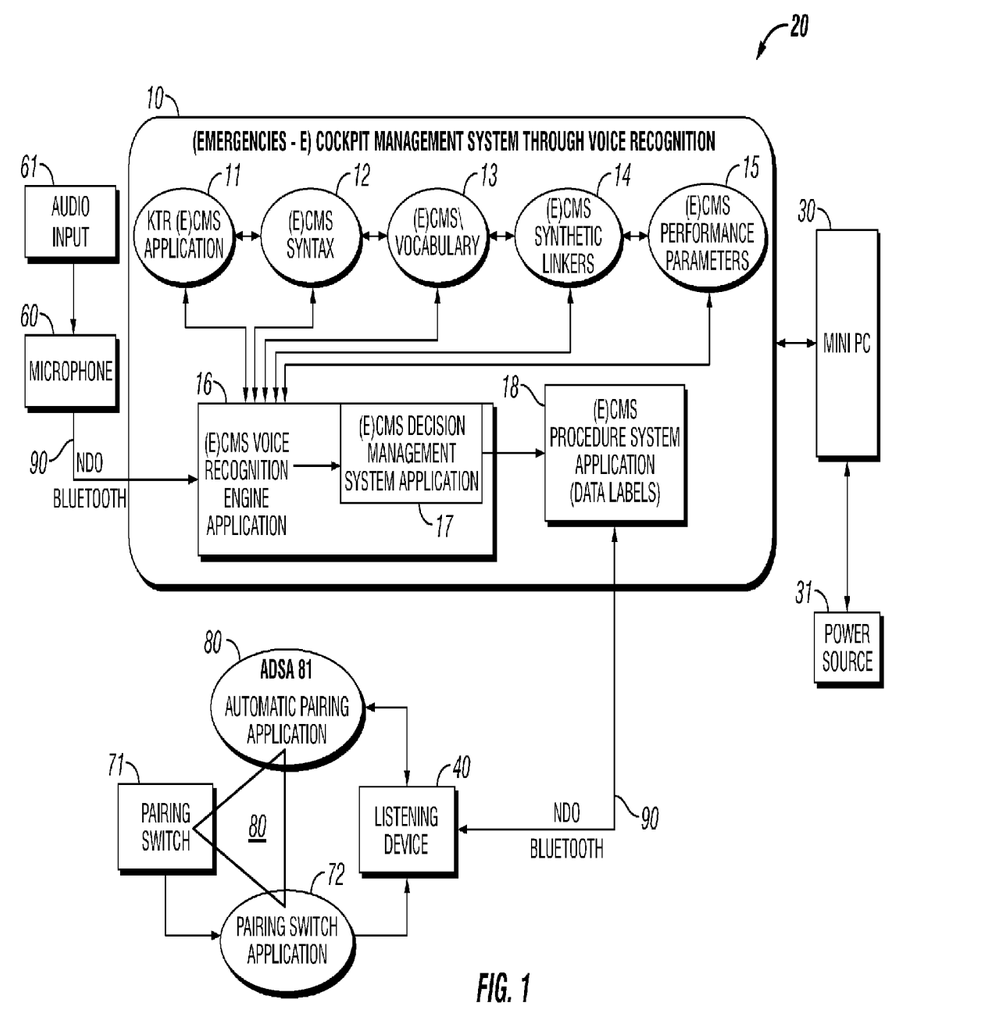
FIG. 1 is a block diagram illustrating the overall of the present invention. A block diagram of the voice activated cockpit management system of the present invention (example for emergency procedure applications).
Figure 2:
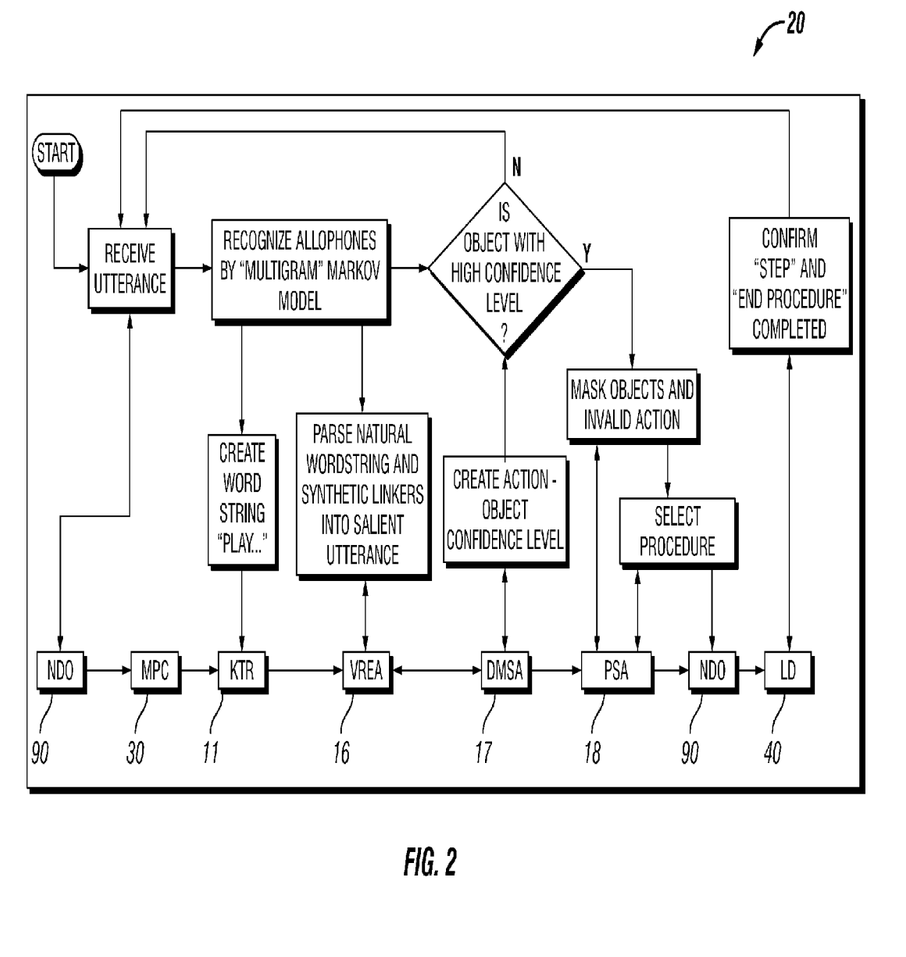
FIG. 2 is a flowchart illustrating the overall operation of the present invention. A process flow chart of the cockpit management system of the present invention (example for the emergency procedure application).

Turning now descriptively to the drawings, in which similar reference characters denote similar elements throughout the several views, the figures illustrate A Voice Activated Cockpit Management System Through Voice Recognition and Audio Display, Mini-PC, Listening Device, Microphone, Power Source, Pairing Switch System, Automatic Pairing Application, Bluetooth Software and Hardware, and A Method for Voice Activation of Procedures In The Cockpit of Single and Multi-Engine Aircraft.

B. A Voice Recognition System for a Cockpit Management System (CMS) Through Voice Activation and Audio Display A voice recognition system 10 for recognizing a string of unique continuous utterances in a speech recognition system of a cockpit management system for the purpose of encoding a specific procedure (i.e. emergency) associated with the utterances.

Conventional speech recognition systems are based on Hidden-Markov-Models with constraints for elongation of the expression to be recognized due to high requirements in memory and computing power of the speech recognition device imposed by the numerous expression parts.

Consequently our novel speech recognition system employs a modified Hidden-Markov-Model that is devoid of SAMPA-transcriptions, machine-readable encoding of ASCII symbols of the phonetic alphabet. In addition our novel speech recognition system does not employ a graphic user interface which is customarily found in related art to date.

The Voice Recognition Engine Application (VREA) 16 is initialized using the CMS Performance Parameters 15.

A Key-To-Recognize (KTR) Application 11 engenders an utterance that initiates interaction with the Voice Recognition Engine Application 16 of the CMS through Voice Recognition and Activation 20 to signal the automatic speech recognition software to begin processing voice commands.

Once initiated, the voice recognition engine monitors all input 61 from the Microphone 60. When Microphone input is comprised of words from the (E)(CMS Vocabulary 13 that are a positive match to the (E) CMS Syntax 12, the output is sent to the (E)CMS Decision Management System Application (DMSA) 17.

The (E) CMS Vocabulary 13 is inclusive of (E) CMS Synthetic Linkers 14. The Synthetic Linkers allow the VREA to recognize continuous individual utterances as words.

The (E) CMS Syntax 12 enables the VREA to group up to five words from the (E) CMS Vocabulary 13 to form a command structure for partial recognition of command procedure. The output from the VREA 16 is passed as the input to the DMSA 17.

(E) CMS Syntax has functional variations for normal checklists procedures, normal navigation approaches, departure procedures, systems monitoring and systems performance, traffic control all related to operations of single or multi-engine aircraft.

C. Voice Activated Cockpit Management System for Single and Multi-Engine Aircraft Through Voice Recognition and Audio Display A novel voice activation through voice recognition cockpit management system for enabling a voice command continuous utterance of unique specific command words to deploy a specific audio command to a specific step associated with said utterance in an elevated noise level environment associated with operating aircraft.

The Voice Recognition Engine Application (VREA) 16 takes input from the Microphone 60 and a downstream analogous-/digital-converter which provides the digital expression, and generates output which is passed to the Decision Management System Application (DMSA) 17. Based on the current state of the DMSA, and the output from the VREA, the DMSA directs which Data Label should be processed through the Procedure System Application (PSA) 18. The PSA accepts the output from the DMSA and displays the corresponding Data Label to the Listening Device (LD) 40.

In our novel implementation, the VREA and DMSA are combined into one binary executable. This combined binary executable invokes the PSA directly, omitting the intermediary translation to text which is customarily found in prior related art.

D. Mini-Pc

A Mini-PC 30 operatively connected to the voice recognition system 10 comprising automatic speech recognition software 16 for processing a digital signal received from said Mini-PC; comprising a processor of minimum 700 MHz, and a memory of minimum 500 MB.

Hardware system comprises in addition to novel low powered Micro PC 30 composed of an ARM11 processor clocked at 700 MHz with 500 MB of SDRAM, 2 USB 2.0 ports, and a GPIO hardware interface. The 2 USB 2.0 ports may be replaced by an onboard Bluetooth V2.1+EDR adapter.

E. Listening Device

A Listening Device 40 used by pilot airmen in the aircraft cockpit specific for communication with Air Traffic Control System, operatively connected to the Emergencies Cockpit Management System Through a Bluetooth Device and Software comprised by the Mini-PC; A Listening Device receiving audio files data through network data objects 90 and displaying audio files data to the pilot ear.

Pilot headset hardware 40 comprising one Electret microphone connected through BlueTooth to MiniPC. Impedance Monaural mode: 160 Ohms ON and OFF. Stereo mode: 320 Ohms ON and OFF. Frequency response 15 Hz to 15 kHz. Sensitivity: 92 dB Sea Pressure Level typical, measured at 1 mw. 1 kHz, full volume on a KEMAR ear simulator. Pilot headset hardware 40 may be Zulu, Bose, David Clark any other headsets that meet the same performance requirements.

F. Microphone

An Electret Dynamic Microphone 60 Operatively Connected to The Listening Device 40 enabling communication of the audio signal to the listening device and conversion of audio signal to digital signal. Electret: Bias required: 8 to 16 VDC through 220 to 2200 Ohms. Sensitivity: Varies depending on bias and AC radio input. Impedance: Typical output is 600 mV at 114 dB Sea Pressure Level. To assure proper modulation of the radio, it is recommended that an avionics technician adjust its input to match the output of the microphone. Dynamic Microphone: Impedance: 5 Ohms. Sensitivity: Equivalent to M-87/M-101. Microphone Variations To Be Included in the Listening Device are: M-87, M-101.

G. Power Source

A Battery Power Source 31 of 12000 mAh Capacity, DC 5V/1.5 A Input and DC 5V/2.1 A Output Operatively connected to the miniPC 30 and enabling the power source to the miniPC through an on/off button. 5V 3.5 w battery capable of supplying a continuous 700 mA. The battery interfaces with the Mini-pc 30 via MicroUSB or GPIO header.

H. Pairing Switch System

A system comprising a pairing button 71 operatively connected to the mini-PC 30, which initiates the one-time initial pairing of the listening device and the voice recognition system through the pairing application software 72 when in depressed position. A corresponding pairing switch application 72, which enables through new software code and blue tooth connectivity 90 the initial pairing of the listening device with the voice recognition engine application 16.

A hardware mounted Pairing Switch 71 is mounted to the Mini-pc (MPC) 30. The pairing switch modifies the voltage of the GPIO-pin-12. The Pairing Initiation Application 72 is a Python application that monitors GPIO-pin-12 on the Mini-pc (MPC) 30 for a change in voltage. Upon voltage change, the Pairing Application 80 is executed. The Pairing Application 80 is a Python application built off of the dbus interface that searches for Bluetooth devices in discoverable mode. The software sorts the Bluetooth class of each found device, retrieving the Bluetooth MAC address of the first device matching the Bluetooth headset class. To eliminate the need for entering a pairing pin code, a pincodes file is created /var/lib/bluetooth/XX:XX:XX:XX:XX (where XX:XX:XX:XX:XX is the MAC address of the Bluetooth adapter) containing the MAC address of Listening Device (LD) 40, and the pin code used for pairing this device. A Bluetooth paired connection is created between the MPC 30 and this LD 40. A file containing the Bluetooth MAC address of the currently connected LD 40 is written to the MPC file system for use by the Automatic Device Sync Application (ADSA) 81. The ASDA 81 is then executed to complete the Bluetooth connection between the MPC and the LD.

In lieu of accepting the first headset found in discoverable mode, a variation of this software searches for a specific Bluetooth headset class or manufacture code to limit the range of headset devices that can connect to the Cockpit Management System for Single and Multi-Engine Aircraft through Voice Recognition and Audio Display 20.

I. Automatic Device Sync Application

A software application 81 operatively connected to the mini-PC 30 which initiates the pairing of the listening device and the voice recognition system after the initial pairing of the listening device has been executed, and repeatedly each time the voice recognition system is turned on and used through new software code and blue tooth connectivity.

The Automatic Device Sync Application 81 is a Python application built off of the dbus interface used to monitor Bluetooth connect/disconnect events. The Bluetooth MAC address of the currently connected Listening Device (LD) 40 is obtained from the file created by the Pairing Application 72. Using this MAC address, the software registers callback functions for the Bluetooth connect and disconnect events via the dbus Python interface.

Upon establishing a Bluetooth connection with the Mini-pc (MPC) 30 a callback is executed which starts the pulseaudio daemon. Pulseaudio sets the Microphone 60 to the default audio source, and the LD 40 to the default audio sink. The successful application of PulseAudio is verified via system output. In the event of an error, the headset is autonomously disconnected and reconnected to reattempt the pulse audio settings. Once verified, an audio notification is sent to the user indicating headset connection success, and the Voice Recognition Software for (E) CMS 10 is executed.

In the event of a Bluetooth headset disconnect event, a callback is executed that shuts down the Voice Recognition Software 10. This prevents multiple instances of the software from running when a Bluetooth headset is repeatedly connected and disconnected from the Mini-PC 30. Alternatives: Python, C, Java code logic for the same function.

J. Bluetooth Software and Hardware

A Linux Bluetooth Protocol Stack BlueZ 90, and a BlueTooth adapter hardware operatively connected to the mini-PC 30 device for wireless transmission of network data objects (NDO) digital signals from the listening device to the Voice Recognition Engine Application 16 located on the mini-PC 30 and transmission of the audio displays from the Procedure System Application 18 to the Listening Device. The Mini-PC (MPC) 30 is fitted with a Bluetooth V2.1+EDR USB adapter. The adapter communicates with the MPC via BlueZ 5.7 Bluetooth stack. An onboard Bluetooth chip may be fitted to the Mini-pc (MPC) 30 in lieu of a USB Bluetooth adapter. Additionally, alternative versions of the BlueZ stack may be implemented.

K. A Method for Voice Recognition of Operating Procedures in the Cockpit of Single and Multi-Engine Aircraft The Method of Voice Recognition of Operating Procedures In The Cockpit utilizes a voice recognition system for translating one or more voice command utterances of unique specific command words to display a specific audio command to a specific step associated with said utterance.

A method for recognizing a continuous utterance in a speech recognition system of a cockpit management system 20, for the purpose of encoding a specific procedure associated with that utterance, comprising the steps of: utilizing a voice recognition (VR) system 10 for translating a voice command utterance of unique specific command words to display a specific audio command to a specific step associated with said utterance; utilizing a key-to-recognize application 11 to initiate said VR system, to signal automatic speech recognition software 16 of said VR system to begin processing voice commands; utilizing a voice recognition subsystem 10 operatively connected to said mini-PC 30 comprising automatic voice recognition software 16 for processing a digital signal received from said mini-PC 30, said voice recognition sub-system sending out data labels 18 to a listening device 40, and networks data objects to Blue Tooth Device 90; utilizing a Blue Tooth adapter, and a Blue Tooth Adapter operatively connected to said mini-PC 30 for managing the placement of audio-displays; the Procedure System Application 18 operatively connected to said Voice Recognition system 16 for rendering and processing said procedure commands displayed by said listening device 40; and the mini-PC 30 for rendering the audio displays based on said data labels.

Blue Tooth communication may be substituted with wire or wireless network communication and associated software.

L. Connections of Main Elements and Sub-Elements of Invention

Voice Activated Cockpit Management System Through Voice Recognition 10 is operatively connected to Voice Recognition Application Engine 16. Key-to-Recognize Application 11 is Operatively Connected to the Voice Recognition Application Engine 16. Cockpit Management System Syntax 12 is Operatively Connected to the Voice Recognition Application Engine 16. Cockpit Management System Vocabulary 13 is Operatively Connected to the Voice Recognition Application Engine 16. Cockpit Management System Synthetic Linkers 14 is Operatively Connected to the Voice Recognition Application Engine 16. Cockpit Management System Performance Parameters 15 are Operatively Connected to the Voice Recognition Application Engine 16.

Decision Management System Application 17 is Operatively Connected to the Voice Recognition Application Engine 16 and Procedure System Application 18 and Manages Audio/Digital Input and Digital/Audio Output using a Decision Tree Algorithm. The Procedure System Application 18 hosts the Data labels files for the procedures (i.e. emergency procedures) and the classification available for calling by the Decision Tree Algorithm included in the Decision Management System Application 17. The Data label files are released by the Procedure System Application 18 through network data objects 90 and blue tooth communication to the listening device 40.

The Audio Input 61 and Microphone 60 are operatively connected to the listening device 40. The Blue Tooth Communication enabled through the Blue Tooth Adapter connected to the mini-PC 30 facilitates the audio input to reach the recognition engine through the listening device and network data objects.

The Cockpit Management System Through Voice Recognition and Output Audio Files 10 is operatively connected to the mini-PC 30, which is operatively connected to a battery power source 31.

The pairing switch button 71 is part of the pairing switch system 70 which contains also a pairing switch application 80 and an automated device sync application 81. When depressed the pairing button 71 initiates the pairing switch application 72 to pair the listening device 40 and the mini-PC 30 for the first time. The Automatic Pairing Application 80 is Operatively Connected to the mini-PC 30 and will connect the listening device 40 and the mini-PC 30 after the initial pairing. The Automated Device Sync Application 81 will connect the listening device 40 and the mini-PC 30 every time afterwards automatically.

M. Alternative Embodiments of Invention

Alternative variations of this invention include an operating system that is Windows based, or Android/Java based and are inclusive of this invention.

Alternative variations of this system include voice recognition that follows a block process voice-text-voice and associated code logic, with all the other software, voice recognition system and all inclusive algorithms, performance parameters, and hardware parameters identical to the current invention. Current novel invention is voice (in) Voice Recognition-audio (out) without transcription intermediates.

N. Operation of Preferred Embodiment

Referring now to the drawings and the characters of reference marked thereon, FIG. 1 and FIG. 2 illustrate a voice activated cockpit management system (CMS) for aircraft procedures for example emergencies (E) CMS, designated generally as 20, in accordance with the principles of the present invention. A Key-To-Recognize (KTR) utterance interacts with the Voice Recognition Engine Application 16 of the (emergencies) cockpit management system 20 to signal automatic speech recognition software to begin processing voice commands. In the preferred embodiment, the KTR utterance of KTR application 11 interacts with a discrete input on Voice Recognition System 10, signaling to the Voice Recognition Engine software 16 through the Decision Management System Application 17 to begin processing voice commands. A Mini PC (MPC) 30 is operatively connected to the KTR utterance for accepting commands from the KTR 11, and processes the results of voice command procedures (i.e. emergency procedures). The KTR utterance is recognized by the KTR application 11. The Mini PC 30 may comprise a 700 MHz processor, and 500 MB of memory, at a minimum. The Mini PC 30 accepts input from other systems to display the results of the procedure commands. A voice recognition (VR) system 10 is operatively connected to the mini PC 30. The VR system 10 includes automatic speech recognition software 16 for processing the digital signal received from the MPC via the listening device LD 40. The VR system 10 is configured to recognize continuous utterances of "multi-gram" unique words and to encode a specific (emergency) procedure associated with the utterance of those words to a digital command string. When the unique word is "PLAY (EMERGENCY type)" the VR system 16 encodes this to a full command string of System-Emergency Description-LOCATION, as shown by process block of FIG. 2. If the operator is a pilot, upon initiation of the KTR, the emergency command string is System-EMERGENCY.

LOCATION CONFIGURATION. The VR system 16 sends out audio (emergency) data labels 18 to a listening device 40, via Network Data Objects (NDOs) 90. The Listening Device may be, for example, ZULU or Bose pilot headset. The PSA 18 renders the audio display based on audio (emergency) data labels. The VR system 16 processes the digital signal by dividing a command string of said digital signal into its individual components, comprising procedure (i.e.) emergency commands, emergency steps and displays, each component being routed by way of an NDO 90 to an appropriate hardware device.

A DMSA 17 operatively connected to the mini PC 30 and manages the placement of audio displays. The DMSA 17 may be, for example, application software partitioned within the mini PC 30. The PSA 18 manages the placement of audio displays within the mini PC 30 via instructions provided by the DMSA application software 17.

The PSA 18 operatively connected to the DMSA 17 renders and processes the procedure command (i.e. emergency).

Commands are displayed by the LD 40. The PSA 18 may be, for example, application software, partitioned within the mini PC. This software renders and processes emergency commands in a display listening device. For each (emergency) procedure command, the final result will be displayed in the preset listening device of the pilot, requiring audio confirmation after execution by the pilot. If after initiation of the KTR utterance, no voice commands have been received after two seconds of system timing, the DMSA 17 will not proceed further with the procedure on the mini PC 30 indicating that the VR System 16 was activated and available to accept voice utterances but had no valid input. A VR log will be recorded at the predefined location on the mini PC 30. VR subsystem 16 is referred to as Automatic Speech Recognition (ASR) software. In the preferred embodiment, this particular software processes the digital signal received from the mini PC 30 at advanced noise levels of up to 136 dB, sending out digital signals to the Recognition Engine Application 16 into the DMSA 17, to the PSA (Data Labels) 18 to the Network Data Objects (NDOs) 90 to the LD 40. The VR system 16 will recognize several command shortcuts, controlling the DMSA 17 accordingly. For example, the pilot may execute and cancel command for the engine failure only by simply speaking "cancel procedure" for any procedure. The pilot may always utilize a full command string, including: PLAY-system-failure-location-actionable environment. With the KTR 11 enacted, VR 16 sends the procedure (i.e. emergency) command and procedure name to the appropriate hardware. When the pairing button is depressed, the pairing application is executed. Other embodiments and configurations may be devised without departing from the spirit of the invention and the scope of the appended claims.

What has been described and illustrated herein is a preferred embodiment of the invention along with some of its variations. The terms, descriptions and figures used herein are set forth by way of illustration only and are not meant as limitations.

Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. A voice activated cockpit management system, comprising:
   a voice recognition system configured to recognize continuous utterances of unique specific words and to engage a specific command to a specific aircraft operating procedure associated with said utterances;
   a Key-to-Recognize utterance embedded into a Key-To-Recognize (KTR) application connected to said Voice Recognition (VR) system, to signal automatic speech recognition software of said Voice Recognition system to begin processing voice commands, wherein said Voice Recognition system comprises:
   a) a mini-PC (MPC) operatively connected to a Bluetooth device for accepting commands from said Voice Recognition system initiated by said Key-To-Recognize utterance;
   b) a Voice Recognition system operatively connected to said mini-PC comprising automatic speech recognition software for processing a digital signal received from said mini-PC;
   c) said Voice Recognition system for sending out data audio files to a Listening Device (LD), and Network Data Objects (NDOs) to a Bluetooth device through Bluetooth or wired communication software and hardware;
   d) said Voice Recognition system operatively connected to a decision management system and decision management system application (DMSA) software which interacts with the key-to-recognize (KTR) software application in the voice recognition system to operate a decision tree algorithm and signal automatic speech recognition software to begin processing voice commands and select procedures using the procedure system application software (PSA);
   e) said Procedure System Application software (PSA) operatively connected to said Voice Recognition system for rendering and processing said procedure commands displayed by said Listening Device;
      said cockpit management system further comprising said Listening Device (LD) for rendering said audio displays based on said data labels;
      said cockpit management system comprising said voice recognition system enabling voice activation in the cockpit and rendering of audio displays through wireless Bluetooth connection communication software and hardware or wired connection communication software and hardware;
      said cockpit management system comprising said Voice Recognition system configured to communicate commands and deploy automatic flight procedures in the cockpit utilizing voice.

2. The cockpit management system according to claim 1, wherein said Voice Recognition system is configured using performance parameters that communicate commands and deploy automatic flight procedures in the cockpit in an environment with elevated noise levels between 0-136 dB wherein said noise levels are compatible with aircraft operation and whereby said voice recognition system parameters satisfy high accuracy, precision, and robustness of voice recognition at said noise levels.

3. The cockpit management system according to claim 1, wherein said Voice Recognition system is configured to recognize a unique utterance and to encode said specific procedure steps into the use of procedure data files; said unique utterance for said Voice Recognition system is "PLAY . . . (procedure type, location and configuration in continuous speech)" and said voice recognition system encodes this to a full command string of procedure steps in an interactive mode where said step execution by user is confirmed with command "step complete".

4. The cockpit management system according to claim 3, said "PLAY . . . (procedure type, location and configuration in continuous speech)" for initiating a signal that an operator is issuing a voice command, wherein if said operator is a pilot, upon initiation of the Key-to-Recognize KTR, the procedure command string is relaying steps associated with each procedure with each step being interactive with operator.

5. The cockpit management system according to claim 1, wherein said Key-To-Recognize (KTR) utterance interacts with a Decision Management System Application (DMSA) of the voice recognition system to signal automatic speech recognition software to begin processing voice commands wherein said Key-To-Recognize KTR initiates automatic communication by the utterance of specific key words resulting in an automatic transference of the commands to executable audio procedures.

6. The cockpit management system according to claim 5, wherein said DMSA interacts with said KTR to operate a decision tree algorithm and signal automatic speech recognition to begin processing and parsing procedure voice commands whereby said DMSA encompasses a decision tree algorithm that enables continuous speech recognition of contiguity limits of up to 150 utterances.

7. Cockpit management system according to claim 6, further comprising a procedure system application (PSA) software and a procedure system data labels library which interacts with said DMSA system to provide search terms without a phonemic transcription.

8. The cockpit management system according to claim 5, wherein said VR system processes said digital signal by dividing a command string of said digital signal into its individual components, said individual components comprising commands, words and audio displays, each said component being routed by way of said NDO to an appropriate hardware device.

9. The cockpit management system according to claim 1, wherein said VR system processes speech recognition in a "multi-gram" mode, using partial speech recognition where the expression to recognize is placed at a beginning of a complete expression, a specific number of triphones are firstly captured with respect to time and are employed in recognition training where the remainder of the captured expression parts are trained using synthetic triphones.

10. The cockpit management system according to claim 1, wherein said VR system comprises cockpit grammar and cockpit syntax specific for audio flight commands and procedures of said VR system which are associated with operation of single and multi-engine aircraft.

11. The cockpit management system according to claim 1, wherein said VR system comprises a cockpit vocabulary specific for audio flight commands and procedures of said VR system, which are associated with operation of single and multi-engine aircraft wherein said VR system comprises cockpit synthetic triphones or linkers organized in a library in the vocabulary of said VR system.

12. The cockpit management system according to claim 5, wherein said Mini PC comprises a 700 MHz processor, a 500 MB of memory, a pairing switch, a battery source, a Bluetooth adapter, and a storage device of 4 GB.

13. A method for recognizing a unique continuous utterance in a speech recognition system of a cockpit management system for the purpose of encoding a specific flight procedure (emergency or normal) associated with that utterance, comprising the steps of:
  utilizing a voice recognition (VR) system for translating a voice command utterance of unique specific command words to display a specific audio command to a specific step associated with said utterance;
  utilizing a voice recognition (VR) subsystem operatively connected to said mini PC comprising automatic speech recognition software and hardware for processing a digital signal received from said mini PC;
  utilizing a Key-to-Recognize (KTR) utterance to initiate said VR system, to signal automatic speech recognition software of said VR system to begin processing voice commands;
  selecting a working speech recognition vocabulary for recognizing speech from said flight procedures based on a response by a user to an initial Key-to-Recognize utterance;
  receiving a spoken word to be recognized;
  responding to determining the confirmation of correctly recognizing the said spoken word using said procedure vocabulary by selecting another one of said voice commands of feedback speech recognition vocabularies, based on a response to a subsequent step in the procedure, for use as a said steps of the procedure recognition vocabulary
  utilizing key-to-recognize (KTR) software application in the voice recognition subsystem;
  utilizing KTR to interact with a decision management system application (DMSA) of the cockpit management system to operate a decision tree algorithm and signal automatic speech recognition software to begin processing voice commands
  utilizing a Procedure System Application (PSA) operatively connected to said VR subsystem for rendering and processing said procedure commands displayed by said Listening Device from the mini PC (MPC) for rendering said audio displays based on said data labels;
  utilizing said VR subsystem for sending out data labels to a listening device Listening Device, and Network Data Objects (NDOs) to a Bluetooth device;
  utilizing a Bluetooth adapter wherein said Bluetooth adapter is operatively connected to said mini PC for managing placement of audio displays.

14. The method of claim 13, wherein said step of translating a voice command utterance of a key command word to a specific procedure further comprises the step of:
  utilizing said VR system configured to recognize said unique key command word and to encode said specific procedure into the use of procedure (i.e. emergency) data files.

15. The method of claim 13, further comprising the step of encoding said voice recognition system a unique word "PLAY . . . (procedure in continuous utterance for example 'engine fire during flight')" to a full command string of steps comprising up to 14 steps, "step complete" feedback, and "(emergency) procedure complete" for procedure completion.

16. The method of claim 13, further comprising the step of:
a) utilizing said Key-To Recognize (KTR) utterance for interacting with a Decision Management System Application (DMSA) to signal an automatic speech recognition software to begin processing voice commands.

17. The method of claim 13, further comprising the step processing said digital signal by dividing a command string of said digital signal into its individual components, said individual components comprising commands, words and audio displays, each component being routed by way of a Network Data Object (NDO) to an appropriate hardware device.

18. The method of claim 13, further comprising the step of communicating digital and audio signal by said VR subsystem through a wireless Bluetooth connection hardware and software or through a wired connection hardware and software.

19. The method of claim 13, further comprising the step of a speech recognition mechanism with recognition for expressions having multiple expression parts, or "multi-gram" mode as a mean to communicate voice commands utilizing the said voice recognition system enabled by application software and hardware wherein said "multi-gram" mechanism further comprising the step of a novel speech recognition mechanism with the expression being subjected to a partial speech recognition using a modified novel Hidden-Markov-Model whereas the partial "multi-gram" expression to recognize is placed at a beginning of a complete expression, and a specific number of triphones are firstly captured with respect to time and are employed in recognition training, while the remainder of the captured expression parts are trained using synthetic triphones or 'synthetic linkers' wherein said mechanism renders said VR speech recognition system a speaker independent speech recognition system optimized for recognition of speech having a range of dialect or accent.

20. A hardware apparatus and cockpit management system for voice activation of flight procedures in single-engine and multi-engine aircraft using voice recognition and audio display comprising:
  a mini-PC, wherein said Mini PC comprises a minimum 700 MHz processor, and 500 MB of memory,
  a pairing switch,
  a battery source,
  a Bluetooth adapter,
  a storage device having a minimum storage capacity of 4 GB; and
  a listening device wherein the hardware apparatus having stored thereon one or more software applications integrated into a voice recognition system wherein each software application comprises code sections executable by a machine for causing said machine to perform the steps of:
    providing a single key-to-recognize utterance enabling a single voice command and an activating voice command;
    recognizing the enabling voice command specifying a procedure and an action to be performed on said procedure;
    storing said action and procedure of said enabling voice command in memory for subsequent use;
    performing said procedure from data labels library stored onto the storage device and object of said enabling voice command
  Said apparatus further having stored a voice recognition system wherein said speech recognition system enables unique and specific audio flight procedures through wireless Bluetooth communication software and hardware further comprising:

an automatic pairing software application which engenders automatic pairing of the listening device to the voice recognition system repeatedly; and a pairing system which includes a pairing switch and a pairing software application which enables the one time initial pairing of the listening device to the voice recognition system.

* * * * *